United States Patent [19]
Cha et al.

[11] Patent Number: 6,029,848
[45] Date of Patent: Feb. 29, 2000

[54] PLASTIC BOX OR BOX ELEMENT, IN PARTICULAR FOR A COMPACT DISC

[75] Inventors: Philippe Cha, Iffendic; Eric Savatte, Vitre; Dominique Taburet, Bais, all of France

[73] Assignee: La Francaise Des Plastiques, France

[21] Appl. No.: 08/894,076

[22] PCT Filed: Jan. 19, 1996

[86] PCT No.: PCT/FR96/00091

§ 371 Date: Jul. 25, 1997

§ 102(e) Date: Jul. 25, 1997

[87] PCT Pub. No.: WO96/23304

PCT Pub. Date: Aug. 1, 1996

[30] Foreign Application Priority Data

Jan. 26, 1995 [FR] France .................................. 95 01141

[51] Int. Cl.[7] .......................... B65D 25/14; B65D 85/57
[52] U.S. Cl. ........................................ 220/837; 206/308.1
[58] Field of Search ................................ 206/308.1, 309, 206/312, 313, 387.1, 756, 776; 220/339, 461, 665, 62.22, 837, 839

[56] References Cited

U.S. PATENT DOCUMENTS

| | | | |
|---|---|---|---|
| 2,144,318 | 1/1939 | Kryder | 220/339 |
| 3,385,422 | 5/1968 | Lowry | 206/756 |
| 3,949,872 | 4/1976 | Paudras . | |
| 4,863,026 | 9/1989 | Perkowski | 206/312 |
| 5,289,785 | 3/1994 | MacPherson et al. | 206/807 |
| 5,358,101 | 10/1994 | Lombardi | 206/776 |
| 5,405,007 | 4/1995 | Iwahashi | 220/339 |
| 5,544,741 | 8/1996 | Fantone et al. | 206/308.1 |
| 5,588,526 | 12/1996 | Fantone et al. | 206/232 |

FOREIGN PATENT DOCUMENTS

| | | |
|---|---|---|
| 272042 | 6/1988 | European Pat. Off. . |
| 576256 | 12/1993 | European Pat. Off. . |
| 2004274 | 11/1969 | France . |
| 9404298 | 7/1994 | Germany . |
| 2154550 | 9/1985 | United Kingdom . |
| 2185710 | 7/1987 | United Kingdom . |

*Primary Examiner*—Jim Foster
*Attorney, Agent, or Firm*—Blakely Sokoloff Taylor & Zafman

[57] ABSTRACT

In conventional manner, the box or a box element is made up of elements, such as cover (1) and a bottom (2) both of which are made of molded plastics material and which are hinged to each other means of a hinge (3); according to the invention, there is included a flexible sheet (4) of synthetic material which is fixed to each of said elements (1, 2) by overmolding and which includes an intermediate free zone (40) which, on its own, constitutes said hinge (3). The protective box can receive various articles, for example compact disks.

7 Claims, 4 Drawing Sheets

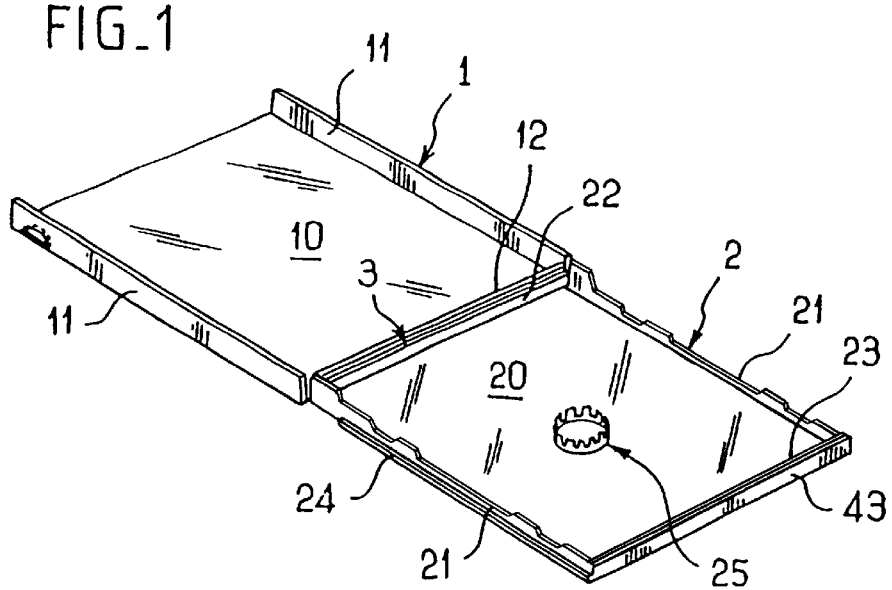
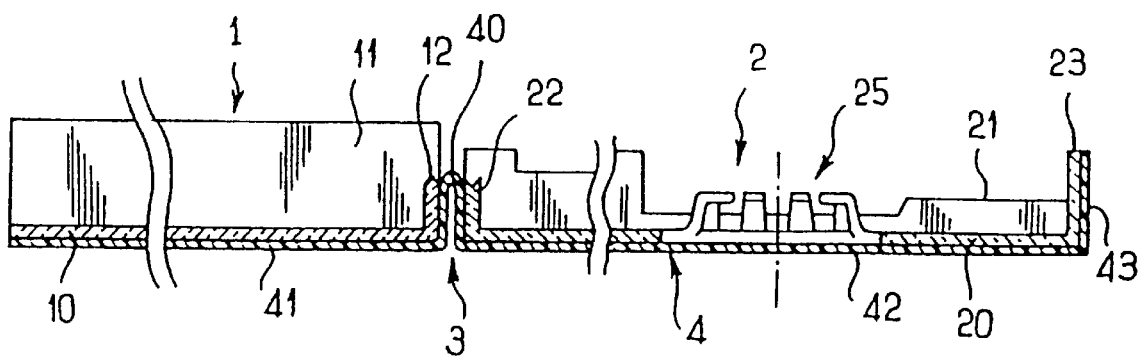
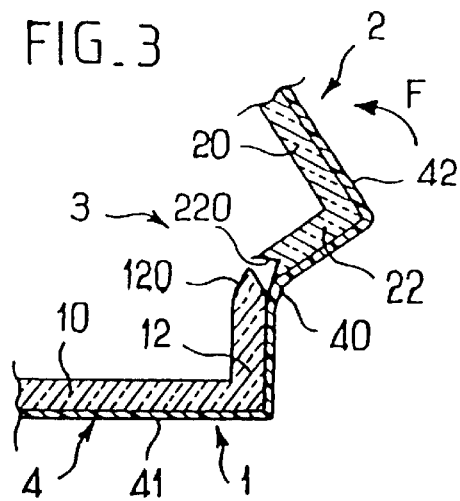
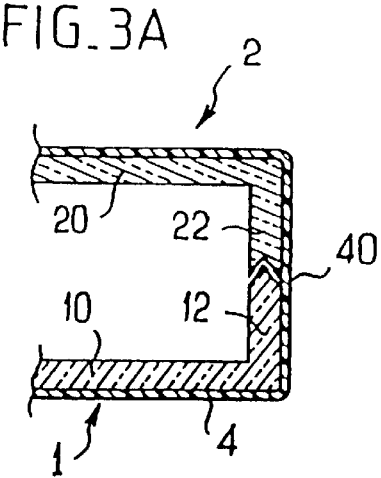

FIG_4
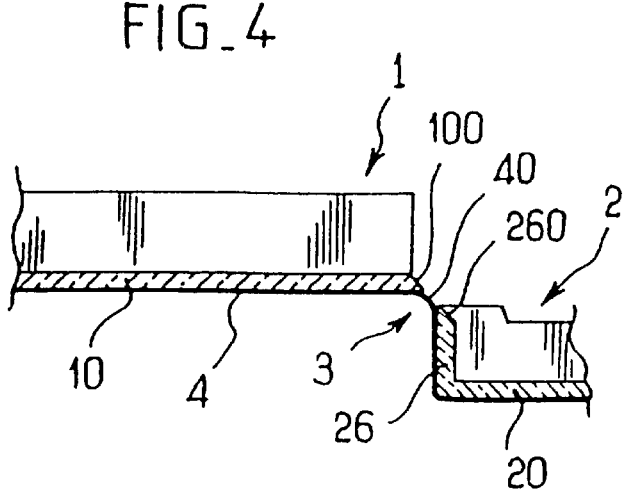
FIG_4A
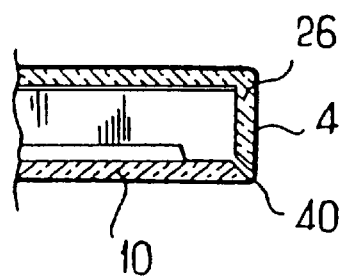
FIG_5
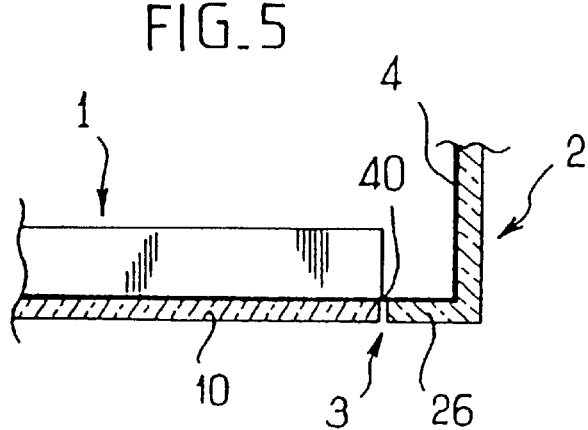
FIG_5A
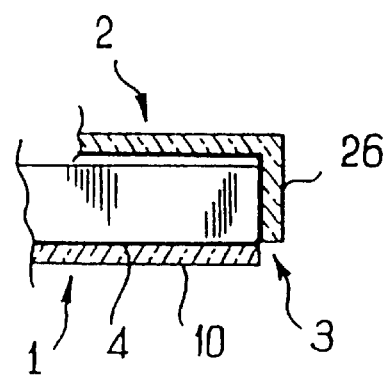
FIG_6
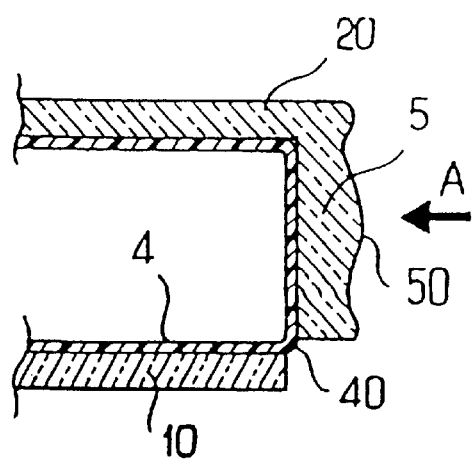
FIG_7
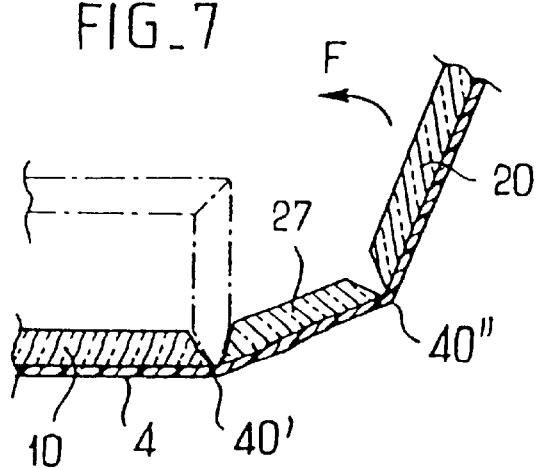

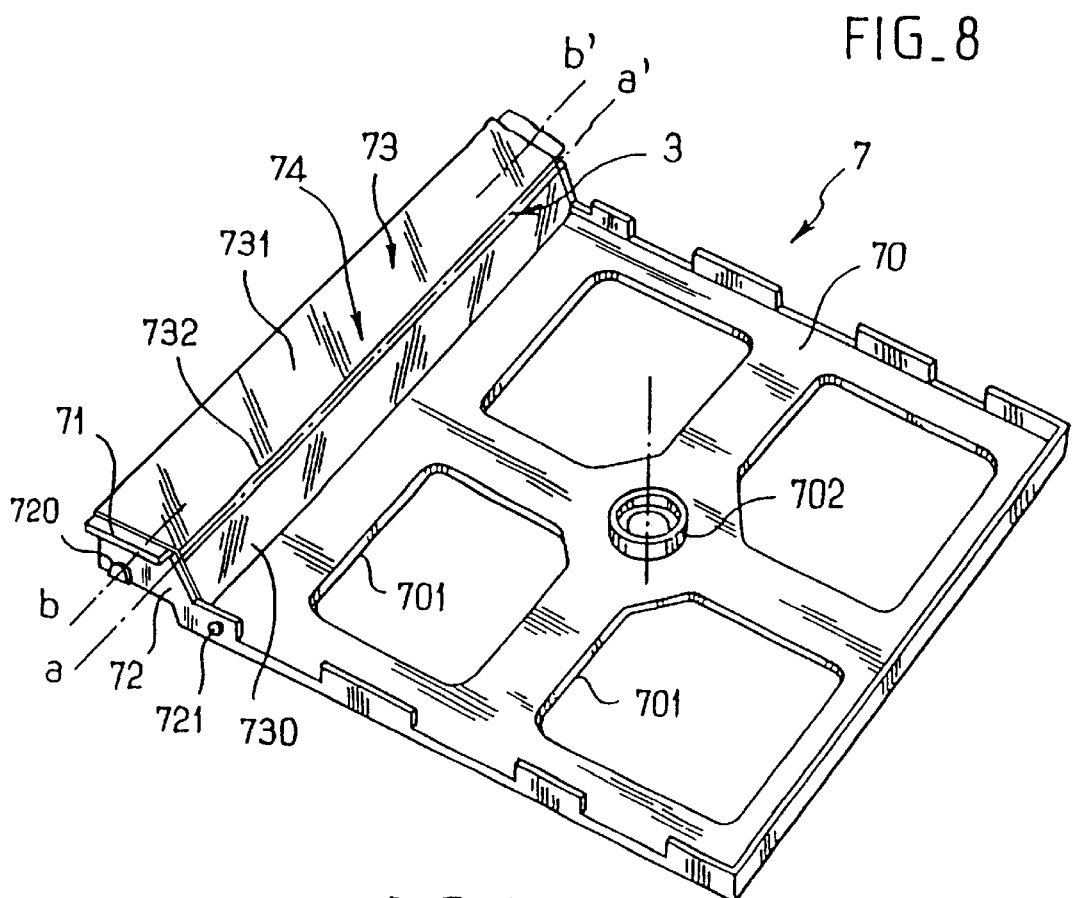
FIG_8
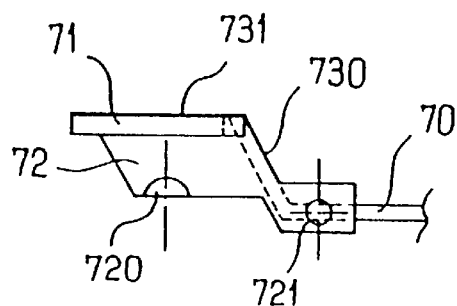
FIG_9
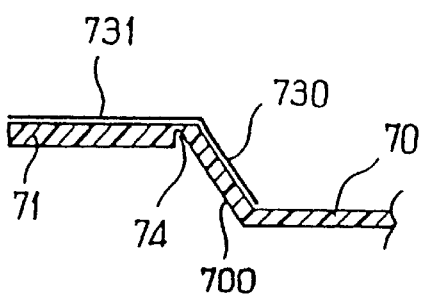
FIG_9A
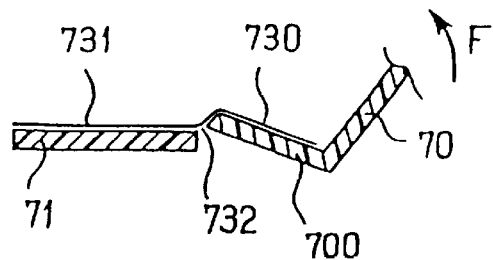
FIG_9B

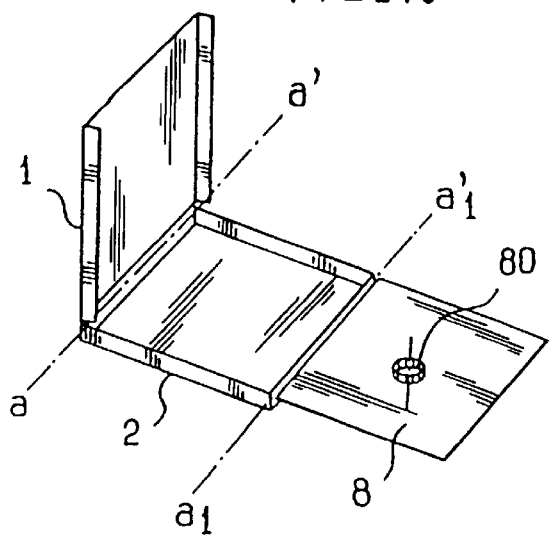
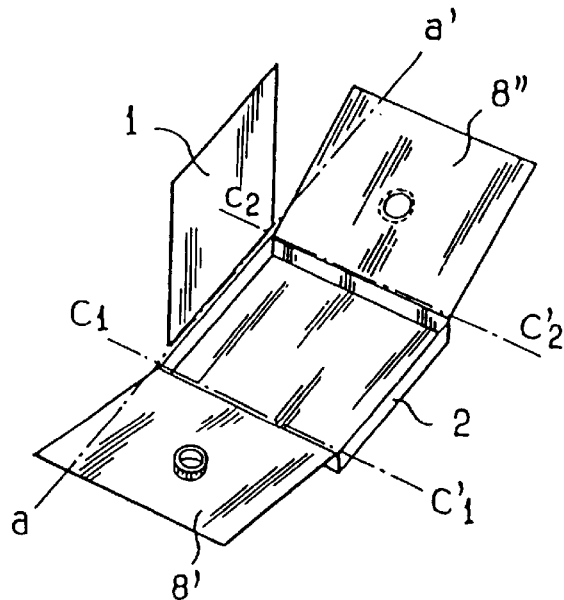
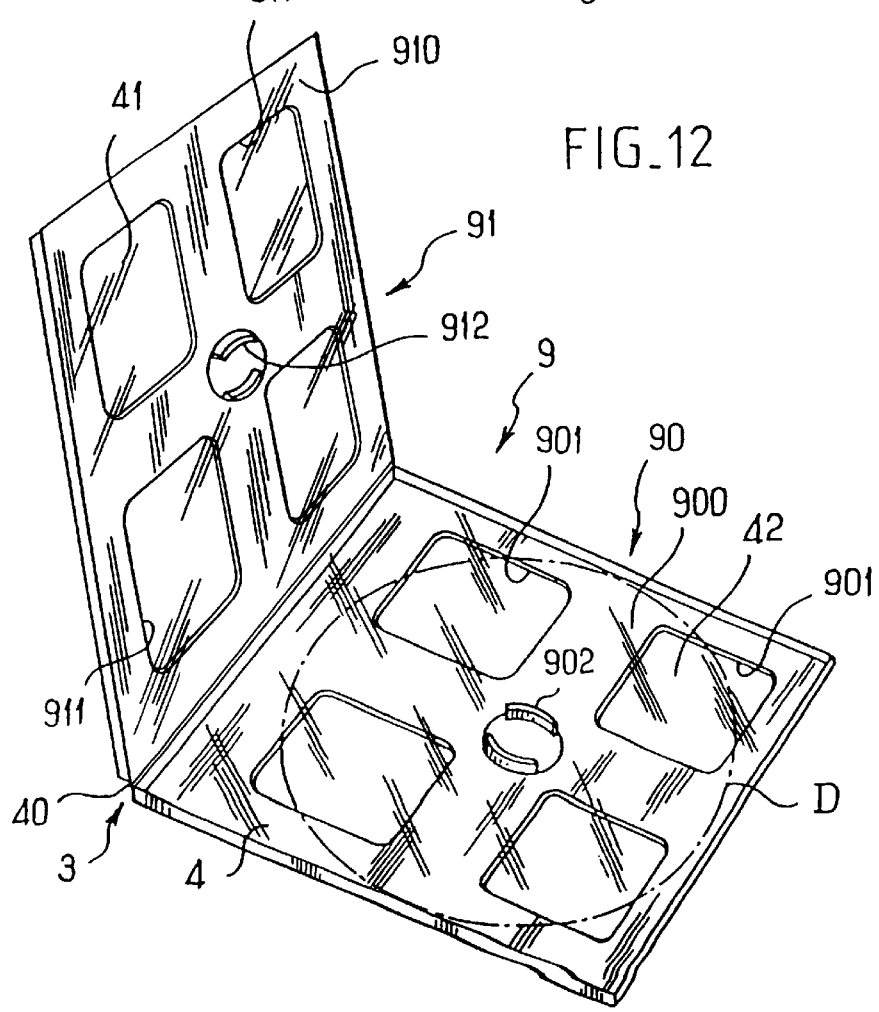

PLASTIC BOX OR BOX ELEMENT, IN PARTICULAR FOR A COMPACT DISC

The present invention relates to a box or a box element, made up of at least two elements, themselves made of molded plastics material and hinged to each other via at least one hinge.

For a box, the two elements can be the bottom and the cover of the box.

The invention is designed for a flat box that is to receive a magnetic or optical medium for high density recording, and more specifically a compact disk (a digital audio disk).

Nevertheless, the invention is applicable to other types of box, capable of containing various articles.

Conventional boxes for compact disks essentially comprise two elements, namely a bottom and a cover, which elements are hinged to each other about a hinge. Both elements are made of rigid transparent plastics material that is injected-molded. The material is generally clear polystyrene.

One of the elements carries two lateral studs which engage in openings provided in the other element, thus forming a pair of stub axles in axial alignment to make up the hinge.

A paper label is inserted inside each box element and can be seen from the outside because the element is transparent, the label carrying information concerning the contents of the disk.

Generally, the cover element label is slid over the inside face of the cover wall and is held therein by lateral tabs: the label is sometimes replaced by, or associated with, a removable booklet.

The disk is held in place in a molded tray of plastics material clipped in the bottom element, with the label being sandwiched between the tray and the bottom wall. The intermediate tray includes a central disk-retaining member made up of radially-deformable resilient fingers which engage in the central opening of the disk; this retaining member is commonly referred to as a "rosette" or a "thimble".

Generally, the bottom label has two marginal flaps folded over at right angles that are placed against the inside faces of the sides of the bottom element. Information is provided on these folded-over flaps to be visible through the sides of the box when the box is stored in such a manner as to be visible edge-on.

That kind of box is relatively expensive.

The three elements making it up (bottom, cover, and intermediate tray) are manufactured separately by injection-molding, and they are subsequently assembled together. In addition to the assembly operation, there is the operation of putting the labels into place.

Another drawback of known boxes is the fragility of the lugs carrying the lateral studs constituting the hinge, and giving rise to rejects on assembly and breakages in use.

Document GB-A-2 154 550 describes a disk-carrying box having a bottom, cover, and spine made by molding a single element made of polypropylene. The bottom and the cover are hinged relative to the spine by lines of weakness obtained by scoring the material.

Also known, from document GB-A-2 185 710, is a box made by injection-molding talc-filled polypropylene. The box is provided with a label constituted by a sheet, likewise made of polypropylene, which is integrated in the box by overmolding during the injection process. The bottom and the cover of that box are formed as a single piece, and they are connected together by a hinge-forming zone of weakness; the polypropylene sheet covers the hinge zone in order to provide it with mechanical reinforcement.

In that known device, the label does not constitute the hinge, and it does not replace the hinge, it merely serves to reinforce it.

A major drawback of the known devices is that the coponent material of the box needs to be a non-breaking flexible material since it needs to act as a hinge and must therefore withstand repeated flexing.

That is why a first object of the invention is to eliminate those various drawbacks by proposing a box structure of the above-mentioned type which, while still being competitive in price, possesses a hinge that is particularly robust and long-lasting.

Another object of the invention is to make it possible to use rigid and brittle materials, in particular clear polystyrene which has remarkable qualities of transparency.

Another object of the invention is to provide a box, in particular a flat box for a compact disk, in which the disk is held in place without requiring the use of an intermediate tray, but is held directly in the bottom element.

In this respect, it should be observed that with conventional boxes, the presence of the label in the bottom element makes it impossible to mold the rosette directly in the bottom wall.

An additional object of the invention is to provide a novel system of holding the disk in the box, inside the bottom element, said system making it easy to install and remove the disk.

An additional object of the invention is to improve the legibility of information visible on the side of the box.

According to the invention, these various objects are achieved by the fact that the box or box element includes a flexible sheet of synthetic material which is fixed to each of the two hinged-together elements that constitute the box by overmolding, that the elements are made of rigid, brittle material, in particular clear polystyrene, and that the flexible sheet has an intermediate free zone which constitutes, on its own, the hinge of the box.

Thus, since the hinge is constituted solely by said zone, it suffices for the material of the sheet to be flexible and to be capable of mechanically withstanding back-and-fourth flexing. The nature of the material used for the box elements is not important. The only essential point is that on overmolding there must be surface adhesion compatibility between the materials of the sheet and of the box elements.

It can be observed from document U.S. Pat. No. 3,949, 872 that proposals have already been made to link the cover element and bottom element of a disk-carrying case by means of a resilient band fixed by gluing or by high frequency electric heat-sealing to the two elements, said band acting as a hinge.

However, that connection method is poorly adapted to the quality and cost price constraints of mass production that exist in certain fields of the industry, in particular for packaging medicines and audiovisual recording media.

Also, according to various advantageous but non-limiting characteristics of the invention:

at least one of said elements possesses a plane main wall, at least one of the faces of which is completely or partially covered by a portion of said sheet;

the plane main wall has weight-reducing openings that are also covered by said sheet;

the sheet is an informative label;

said elements are made of transparent plastics material;

the sheet is made of transparent material;

the label-forming sheet includes information on both faces; and the flexible sheet is made of a material having good mechanical strength while being compatible on molding with the plastics material constituting said elements, said material being, in particular, a polypropylene-polystyrene or a polyethylene-polystyrene composite.

When the invention relates to a box:

one of the elements is a bottom and the other is a cover, and said two elements have complementary mutually engaging profiles disposed facing each other in the hinge zone and suitable for providing mutual guidance for the two elements while the box is being closed, and then for providing relative locking therebetween after closure;

each of the box element and the cover element possesses a main plane wall, one of whose faces is completely or partially covered by a portion of said sheet, and at least one of the main walls has a rim adjacent to the hinge and likewise covered by the sheet;

the rim is provided with a profile for mutual engagement; and the sheet portion covered by said rim carries, on its face adhering thereto, informative marking visible through the transparent thickness of said rim, which rim is shaped to form a magnifying glass.

The sheet can be fixed to the bottom and cover elements either via their outside faces or via their inside faces.

According to other possible characteristics of the box or of the box element:

it is designed to receive at least one recording medium, such as a compact disk;

at least one of its hinged-together elements is provided with members for centering and retaining the disk; and these members are constituted by a rosette integrally molded with the elements and suitable for engaging in the central hole of the disk.

In a possible embodiment of the box, the box is flat in shape, rectangular in outline, and of small thickness, and its bottom element carries the members for centering and retaining the disk.

According to other possible characteristics:

said sheet contains anti-theft detection means;

one of the hinged-together elements of the box element consists in a tray suitable for supporting and retaining a pair of compact disks, each against a respective one of its two faces, while the other element consists in a support strip, the assembly being dimensioned and shaped in such a manner as to be capable as being inserted inside a box having shape and dimensions similar to a box designed to receive a single compact disk;

said elements are connected to each other by at least one frangible tab such that they initially form a rigid assembly facilitating automatic positioning of disks on the tray, and positioning of the box element in the box; and the support strip includes lateral webs provided with projections enabling it to be snap-fastened in the box.

Other characteristics and advantages of the invention appear from the description and the accompanying drawings which show preferred embodiments as non-limiting examples.

In the drawings

FIG. 1 is a perspective view of a flat compact disk box of the invention, shown in the open state;

FIG. 2 is a cross-section view of the box of FIG. 1, the section plane being perpendicular to the axis of the hinge;

FIGS. 3 and 3A are detail section views of the hinge zone, respectively while closing is taking place, and at the end of closing;

FIG. 4 is a detail view of the hinge zone of a first variant of the box, the box being open;

FIG. 4A is a view similar to FIG. 4, showing the box closed;

FIGS. 5 and 5a are views similar to FIGS. 4 and 4a respectively, for another variant embodiment;

FIG. 6 is a detail view of a third variant in which the side produces a magnifying glass effect;

FIG. 7 shows a fourth variant having two hinges;

FIG. 8 is a perspective view of a box element of the invention having a pivoting tray for receiving a pair of compact disks;

FIG. 9 is an end view of the strip constituting the box element of FIG. 8;

FIGS. 9A and 9B are fragmentary section views showing the hinge zone of the two portions of said box element, respectively before and after the tray has been pivoted, the section plane being the mid-longitudinal plane of symmetry of the element;

FIGS. 10 and 11 are on a smaller scale and show two possible embodiments of boxes for receiving a plurality of compact disks and provided respectively with one and with two pivoting disk-carrying trays; and FIG. 12 is a perspective view of a lightweight box whose bottom and cover elements are perforated to a large extent.

The box shown in FIGS. 1 and 2 is to receive and package a compact disk, and it comprises two injection-molded clear polystyrene elements, namely a bottom element 2 and a cover element 1.

Reference 10 designates the rectangularly-shaped main wall of the element 1, and reference 20 designates the similarly-shaped main wall of the element 2.

These two elements are hinged together like the pages of a book by means of a hinge zone 3.

In conventional manner, the cover element 10 possesses lateral flanks 11 folded at right angles relative to the wall 10; the element 20 possesses similar lateral flanks 21 which are notched in the central zone to make it possible to take hold of a disk retained in the box.

Remote from the hinge 3, the element 2 has a partition 23 which likewise extends at right angles to the wall 20.

The flanks 21 are set back relative to the edge of the wall 20, thereby leaving a lateral rim 24.

When the box is closed, the flanks 21 come into contact against the flanks 11, inside said flanks, while the partition 23 constitutes the side of the box remote from the hinge 3.

As explained below, a label-forming sheet is fixed to the outside faces of the elements 1 and 2, with a portion 43 thereof that is folded over the partition 23 being visible in FIG. 1.

Resilient locking means (not shown) such a small projections provided in one of the elements and engaging in recesses provided in the other element, serve to hold the box in the closed state.

Close to the center of the wall 20, the bottom 2 has a rosette 25 that is integrally molded with the bottom element; the rosette has resilient fingers suitable for engaging in the central opening of the disk to hold it in place against the wall 20 and prevent it from moving inside the box.

This well-known disk-retaining system is not described in detail herein to avoid overburdening the description.

In the hinge zone 3, the walls 10 and 20 are folded-over at right angles so as to form respective adjacent partitions 12 and 22. The height of these partitions is equal to half the thickness of the box when in its closed state, thereby enabling these two partitions to be in a common plane when the box is closed (see FIG. 3A).

According to an essential characteristic of the invention, the box includes a flexible sheet 4 of synthetic material. It is made of a material that has good mechanical strength, particularly against tearing and against back-and-forth flexing; in addition, the material must be compatible with the plastics material constituting the box elements 1 and 2 so as to be capable of adhering thereto by overmolding.

As suitable materials, mention can be made, for example, of polypropylene-polysytrene or polyethylene-polysytrene composites; these comprise a sandwich film obtained by adhesion or by coextrusion, but that is not limiting.

As an indication, the thickness of the sheet 4 may lie in the range 50 micrometers to 150 micrometers, for example it may be about 80 micrometers.

The sheet 4 is a rectangular sheet of width equal to the width of the walls 10 and 20, and of length slightly greater than the sum of the lengths of the walls 10 and 20 plus the heights of the sides 12, 22, and 23.

In these figures, references 41, 42, and 43 are given to those portions of the sheet which adhere respectively to the faces 10 and 12 of the element 1, and 22, 20, and 23 of the element 2. The intermediate free zone between the two elements is referenced 40.

In the embodiment of FIGS. 1 to 3, the sheet 4 adheres to the outside faces of the box.

The elements 1 and 2 are made in a single appropriate mold by injection, with the sheet 4 having previously been put into place in the mold.

For overmolding of better quality, it is preferable for the polystyrene face of the sheet to be the face that faces into the inside of the mold so as to come into contact with the molten clear polystyrene, when it is injected into the mold. Nevertheless, that is not essential.

Before and during molding, the sheet can be retained inside the mold by any means known in the injection molding art, and in particular by implementing an electrostatic effect.

After unmolding, the sheet portions 41 and 42 adhere completely with the elements 1 and 2 respectively, while the free intermediate zone 40 acts as a hinge given the flexibility and suppleness of the sheet.

As can be seen in FIGS. 3 and 3A, the free edges 12 and 22 have complementary engaging shapes 120–220, one of which is concave and the other of which is convex (e.g. V-shapes or U-shapes), thereby serving to guide them while the box is being closed, with such closure being symbolized by arrow F in FIG. 3. Thus, after closure, these shapes thus lock the portions 1 and 2 against movement in translation relative to each other.

According to advantageous characteristics of the invention, the sheet 4 is printed and acts as an informative label, which function has previously been provided by paper labels that needed to be inserted in the elements 1 and 2.

Advantageously, the sheet 4 is printed prior to the molding operation such that a finished product leaves the mold ready to receive a compact disk.

Preferably, the portions 41 and 42 cover the outside faces of the portions 10 and 20 respectively in full. Nevertheless, it is entirely possible for them to cover said faces in part only.

The information, in the form of writing, photographs, drawings, and/or other symbols, is printed on the outside face thereto. Writing may also be provided on the sides of the box, overlying the portions 12, 22, and 23.

Nevertheless, because the elements 1 and 2 are made of transparent material, it is also possible to provide information marking on the inside face of the sheet 4, such marking becoming visible when the box is opened.

In the embodiment shown in FIGS. 4 and 4A, one of the elements, in this case the element 1, does not have a partition in the vicinity of the hinge. The other element 2 does have such a partition, referenced 26. The free zone 40 of the sheet 4 is thus directly at the end of the wall 10.

Merely by observing FIGS. 4 and 4A, it can be seen how this portion 40 acts as a hinge.

The free edges 100 and 260 of the walls 10 and 26 respectively are advantageously chamfered to give sufficient clearance to the hinge zone 3, even though the free zone 40 of the sheet is narrow (thereby limiting clearances).

In the embodiment of FIGS. 5 and 5A, the sheet 4 is fixed to the inside of the box; the embodiment shown is similar to that of FIG. 4, the element 1 having no partition, while the element 2 includes a partition 26.

The sheet 4 consequently adheres to the inside face of the wall 10 and to the inside faces of the wall 20 and of the partition 26.

The information provided on the outside face of the sheet 40 nevertheless remains visible because these walls are transparent.

In this embodiment, the extent to which the box can be opened is limited (see FIG. 5).

In the variant of FIG. 6, the end partition of the portion 20, given reference 5, has a special configuration.

Its outside face 50 bulges so as to be curved in such a way as to act as a magnifying glass. It is appropriate to mention that this characteristic is known per se (see DE-U-9 404 298).

Thus, when looking at the side of the box, at its hinge end, as symbolized by arrow A, an observer can read marks on the sheet 4 in register with the partition 5 in magnified form, thereby improving legibility.

In the variant of FIG. 7, which shows the box being closed, the box has two hinges. The side of the box is constituted by a plate 27 interposed between the walls 10 and 20. The flexible sheet 4 is overmolded over all three of these elements, having two hinge-forming free zones 40' and 40". Chamfered ends analogous to the ends 100 and 260 of FIG. 4 make complete closure possible, as represented in chain-dotted lines in the figure.

Proposals have already been made to insert a theft-detection label into a box containing a compact disk or some other article. The label is provided with an electronic microcircuit, a magnetic track, a metal powder, or encoded information, or other means (e.g. copper particles) suitable for being detected by special means which are installed, for example, in a gate situated at the exit from a shop.

The problem then arises of the risk of a label being removed which would make label detection inoperative.

In a development of the present invention, anti-theft detection means are directly contained in the sheet 4 or are fixed thereto.

Thus, when the detection means are constituted by a printed circuit, the circuit can be printed directly on the sheet either before or after it is overmolded in the remainder of the box. Such means are therefore impossible to remove.

The box element 7 shown in FIGS. 8 and 9 is of the same general type as that constituting the subject matter of document U.S. Pat. No. 5,284,243.

It comprises a device having a support strip 71 of plastics material to which a pivoting tray 70 is hinged. In conventional manner, the tray has two central rosettes 702 (only one of which can be seen in FIG. 8) for the purpose of centering and holding respective compact disks (not shown) on each of its two faces. The tray includes perforations 701 to make it lighter in weight.

At each of its two ends, the strip 71 has a transverse web 72 provided on the outside with a pair of projections 720, 721.

The assembly 70–71 is shaped and dimensioned in such a manner as to be capable of being inserted in a box similar to the standard box, and initially designed to receive only one compact disk.

In the sides of the box, the projections 720 snap into holes for receiving (in the opposite direction) the stub axles for hinging the cover onto the bottom element of the box, where the hinge axis is referenced bb' in the figure.

The projections 721 snap into other holes provided in the side walls of the bottom element of the box.

Still in conventional manner, the tray 70 has a sloping rim 700 adjacent to the strip and hinged to one side of the strip via a hinge 3 about an axis aa' parallel to bb'.

In the embodiment constituting the subject matter of above-mentioned document U.S. Pat. No. 5,284,243, said hinge 3 is implemented by a line of weakness in the material, so the elements 71 and 70 constitute a one-piece molding.

In accordance with the present invention, this hinge is made by means of a flexible sheet 73 which, as in the box embodiments described above, is fixed to each of the elements 71 and 70 by overmolding, so these elements are constituted by separate parts.

References 730 and 731 designate zones of the sheet 73 which adhere to the parts 700 and 71 respectively. They are separated by a narrow gap or intermediate free zone 732 which, alone, constitutes the hinge 3.

Naturally, as in the preceding embodiments, the sheet 73 and the elements 70 and 71 must be made of materials that are compatible with molding.

In addition, the sheet 73 must be mechanically strong, both in traction and in flexing.

The materials used can be the same as those mentioned above.

In the embodiment shown, reference 74 designates an attachment zone or tab connecting the rim 700 to the strip 71. This zone is provided in the central zone (in the longitudinal midplane of symmetry of the box element) and it is obtained by having an appropriate channel in the mold, enabling the strip 71 and the part 70 to be molded as a single block.

The resulting assembly is not deformable and is therefore easy to handle, particularly while compact disks are being put into place on the tray 70 by means of an automatic machine, and subsequently while the device is being inserted into a box.

The attachment tab 74 is frangible, i.e. it has low mechanical strength, thereby making it easy to break.

Thus, on the first occasion that the tray is pivoted (arrow F, FIG. 9B), the tab 74 breaks, and the part 70 is thereafter hinged to the strip 71 by the free sheet zone 732.

Naturally, the sheet 73 can be printed either on both faces (which is advantageous only if at least one of the parts 70 and 71 is made of transparent material), or else on one face only, thereby likewise acting as a label providing information and/or decoration.

The part 730 of the sheet can be given sufficient area for it also to cover, completely or in part, the main part 70 of the tray.

The box shown in FIG. 10 includes a bottom element 2 to which a cover element 1 is hinged by means of a hinge about axis aa'.

A tray 8 is provided with two centering and retaining rosettes 80 suitable for receiving a pair of compact disks (not shown) and is itself hinged to the element 2 by means of a hinge of axis $a_1a'_1$.

The axes aa' and $a_1a'_1$ are parallel, with the hinges being located on the two opposite transverse sides of the element 2.

The box of FIG. 11 has two disk-carrying trays 8' and 8" each hinged to the bottom element 2 about a respective axis $c_1c'_1$ and $c_2c'_2$, this time disposed on the two opposite lateral sides of the element 2, perpendicular to the axis aa'.

In accordance with the invention, the hinge axes $a_1a'_1$, $c_1c'_1$, $c_2c'_2$ may be implemented by intermediate free zones of flexible sheet adhering by overmolding firstly to the bottom element 12 and secondly to the corresponding tray 8, 8' or 8", respectively.

FIG. 12 shows a thin and lightweight box 9 more particularly intended for receiving a compact disk D (whose outline is represented by a chain-doted line) of the CD-ROM type. It is formed by two similar elements 90 and 91 of rectangular outline that are hinged to each other by a hinge 3.

The elements 90 and 91 are thin trays with slightly raised rims, between which it is possible to hold captive a compact disk D when the box is closed.

Complementary circularly-arcuate central ribs 902 and 912 suitable for penetrating in the central opening of the disk serve to hold the disk in the box. Each tray 90, 91 has large perforations acting as weight-reducing openings 901, 911, e.g. in the form of squares with rounded corners.

It should be observed that such openings are well known per se (see for example EP-A-0 576 256).

In accordance with the invention, a label sheet 4 adhering to the elements 90 and 91 by overmolding performs the hinge function by means of its intermediate free zone 40. In the embodiment shown, the portions 41 and 42 of the sheet 4 which adhere to the plane portions 900 and 910 (respectively) of the elements 90 and 91 (respectively) are situated inside the box. The sheet overlies the openings 901 and 911. It has openings shaped to go round the projecting portions 902 and 912.

Conventional snap-fastening means (not shown) can be provided to hold the two portions 90 and 91 together in the closed state.

The material constituting the elements 90 and 91 is perfectly transparent; for example it may be constituted by clear polystyrene.

Advantageously, the sheet 4 is also transparent, such that the disk and the writing thereon can be seen even when the box is closed.

Nevertheless, they may also carry printed marking, either over their entire surface area, or over certain zones only.

Although light in weight, because of the openings 901 and 911, the elements 90 and 91 act as reinforcements giving the box a degree of rigidity.

In addition to the hinge function and possibly the label function, the sheet 4 also acts to provide protection, with the disk being protected in particular from dust and from finger-contact while it is inside the closed box.

This type of cheap box that nevertheless provides good protection to the disk can advantageously replace the lightweight card envelopes usually implemented for disseminating CD-ROMs, in particular when they are sold in association with a magazine.

A box, or a box element, of the present invention can receive various articles, and not only information media such as compact disks.

As non-limiting examples of other applications, mention can be made of boxes for receiving foodstuffs or medicines.

Thus, in a pharmaceutical application, the box containing medicine has a bottom and/or a cover of transparent material (clear polystyrene in particular) and use may advantageously be made of a hinge sheet that also acts as a label which is printed on both faces. The outside face carries information that is preferably in color relating to the trademark of the product and enabling the medicine to be identified. The inside face which can be seen after the box has been opened, carries information for the patient (instructions for use, dosages, side effects, composition, etc.). Until now, this kind of information been printed on a folded paper note inserted in the box together with the medicine, but inconvenient to use and running the risk of being easy to lose.

We claim:

1. A box flat in shape, rectangular in outline, and thin, designed to receive a compact disc (D), which is made up of two elements made of rigid and brittle, plastics material, which are molded by injection, namely a bottom (2,91) and a cover (1,90), both possessing a plane main wall (10, 20, 900, 910), said cover (1,90) and bottom (2,91) being hinged to each other by, and solely by, the intermediate free zone (40) of a flexible sheet (4) made of a material having good mechanical strength while being compatible, on molding, with the plastics material constituting said elements (1,2,90, 91), said sheet (4) covering completely one of the faces of both said plane main walls (10, 20, 900, 910), and adhering to them by overmolding in the injection mold, wherein said elements (1,2,90, 91) are made of transparent clear polystyrene, while said sheet (4) is an informative label which is made of polypropylene-polystyrene or a polyethylene-polystyrene composite and carries information which is visible through said plane main walls (10, 20, 900, 910).

2. A box according to claim 1, wherein said sheet (4) includes information on both faces.

3. A box according to claim 1, wherein at least one of said plane main walls (10, 20) has a rim (12, 22, 26, 27, 5) adjacent to the hinge (3) and covered by the sheet (4).

4. A box according to claim 1, wherein said sheet (4) is fixed to the outside faces of said elements (1–2; 90–91).

5. A box according to claim 1, wherein said sheet (4) contains anti-theft detection means.

6. A box according to claim 1, wherein at least one of said elements (2; 90–91) is provided with means for centering and retaining the disc.

7. A box according to claim 6, wherein said centering means comprises a rosette (25) integrally molded with the element (2), said rosette (25) adapted to engage a central opening of the disc (D) engaging in the central opening of the disc (D).

* * * * *

UNITED STATES PATENT AND TRADEMARK OFFICE
CERTIFICATE OF CORRECTION

PATENT NO. : 6,029,848

DATED : February 29, 2000

INVENTOR(S) : Cha et al.

It is certified that error appears in the above-identified patent and that said Letters Patent is hereby corrected as shown below:

In column 2, line 6, delete "the coponent" and insert -- the component -- .

In column 2, line 42, delete "back-and-fourth" and insert -- back-and-forth -- .

In column 3, line 65, delete "In the drawings" and insert -- In the drawings: -- .

Signed and Sealed this

Third Day of April, 2001

Attest:

NICHOLAS P. GODICI

Attesting Officer

Acting Director of the United States Patent and Trademark Office